United States Patent [19]

Creswell et al.

[11] Patent Number: 5,222,125
[45] Date of Patent: Jun. 22, 1993

[54] SYSTEM FOR PROVIDING PERSONALIZED TELEPHONE CALLING FEATURES

[75] Inventors: Carroll W. Creswell, Basking Ridge; Francine S. Frome, Watchung; Daniel Furman, Maplewood, all of N.J.; Philip S. Kravitz, Brooklyn, N.Y.; Ramnath A. Lakshmi-Ratan, Chatham, N.J.; Steven G. Lanning, Gillette, N.J.; Bernard S. L. Renger, Chatham, N.J.; John A. Rotondo, Murray Hill, N.J.

[73] Assignee: AT&T Bell Laboratories, Murray Hill, N.J.

[21] Appl. No.: 754,109

[22] Filed: Sep. 3, 1991

[51] Int. Cl.⁵ .................... H04M 1/64; H04M 3/42
[52] U.S. Cl. ............................. 379/67; 379/88; 379/89; 379/201; 379/112; 379/114
[58] Field of Search ............ 379/67, 88, 89, 201, 379/207, 112, 114

[56] References Cited

U.S. PATENT DOCUMENTS

| | | | |
|---|---|---|---|
| 4,313,035 | 1/1982 | Jordan et al. | 379/207 |
| 4,327,251 | 4/1982 | Fomenko et al. | 179/1 |
| 4,785,473 | 11/1988 | Pfeiffer et al. | 379/89 |
| 4,825,460 | 4/1989 | Carter et al. | 379/67 |
| 4,847,890 | 7/1989 | Solomon et al. | 379/6.7 |
| 4,866,756 | 9/1989 | Crane et al. | 379/88 |
| 4,878,240 | 10/1989 | Lin et al. | 379/67 |
| 4,899,373 | 2/1990 | Lee et al. | 379/201 |
| 4,908,850 | 3/1990 | Masson et al. | 379/88 |

FOREIGN PATENT DOCUMENTS

9006729  5/1991  PCT Int'l Appl. .

Primary Examiner—James L. Dwyer
Assistant Examiner—Fan Tsang
Attorney, Agent, or Firm—F. B. Luludis

[57] ABSTRACT

A common adjunct switch integrated with a telecommunications network and associated with a plurality of predetermined telephone numbers prefixed by a common code is provided with a facility which allows telephone subscribers that are assigned respective ones of the telephone numbers to personalize the way in which they receive long distance telephone calls. For example, such a subscriber may program his/her associated service record to put into effect call forwarding or call screening. In addition, each such subscriber may be associated with one or more caller identification numbers, in which a caller identification number is used to determine whether a call placed to a service number is billed to the called subscriber or the calling party.

22 Claims, 6 Drawing Sheets

| SEC. CODE | SUB. PIN | DFLT. SVC | PHONE. NUM |
|---|---|---|---|
| NU | HOME PHONE | CALL. FWD | M. MASK |
| NONCIN. GT | NUM. MSG | NUM. CIN | NU |
| CS. NUM | CS. TIME | CALL. SCN | CF. TIME |
| CIN. 4 | CIN. 3 | CIN. 2 | CIN. 1 |
|  |  |  |  |

SYSTEM FOR PROVIDING PERSONALIZED TELEPHONE CALLING FEATURES

FIELD OF THE INVENTION

The invention relates to public switched telephone systems, and more particularly relates to a public switched distance telephone network adapted to provide a common platform for the provision of customer controlled features.

BACKGROUND OF THE INVENTION

Various types of so-called customer provided equipment such as Private Branch Exchanges (PBXs) provide a number of call processing options which allow business employees to customize the way in which they receive and establish telephone calls. For example, a business employee operating his/her business telephone station set may program an associated PBX so that the PBX (a) forwards to another business telephone station set that is served by the same PBX telephone calls directed to the employee's business telephone station set; (b) establishes a so-called conference connection; or (c) transfers an incoming call to another business telephone station set also served by the same PBX. Unfortunately such employees do not enjoy all such telephone call capabilities in conjunction with using their home telephone station sets. At most, such employees including other telephone subscribers may subscribe to a few telephone services that are typically offered by their respective local exchange carriers. Such services include, for example, a voice mail message service, call waiting service and the aforementioned call forwarding service. However, one limitation associated with locally offered services, e.g., call forwarding, is that, typically, they can only be programmed from the subscriber's home telephone station set or a telephone station set located within the area served by the offering local exchange carrier.

It is often the case that a telephone subscriber who is at a distant location needs to place a long distance telephone call to his/her home telephone station set or to another telephone station set. As is well-known, such a person may place a long distance telephone call from a so-called coin telephone station set. However, to do so, a prescribed amount of money needs to be inserted in the coin telephone to cover the cost of the long distance call for an initial predetermined calling period. As is also well-known, a long distance call may be extended beyond the initial calling period only if additional money is inserted in the coin telephone. The burden associated with placing a long distance telephone call via a coin telephone station may be dealt with by placing such a call through a so-called long distance telephone operator. In such an instance, the cost of the long distance call may be charged to a credit card acceptable to the long distance carrier or "reversed" to the called telephone station. It can be appreciated that in the first instance, the calling subscriber must accept the burden associated with maintaining a credit card acceptable to the long distance carrier. It can also be appreciated that in the second instance the called party may not accept the charges for the long distance call.

SUMMARY OF THE INVENTION

An advance in the art of telephone switching systems is achieved by disposing in a telecommunications system an adjunct operative for allowing telephone subscribers to control the manner in which they receive telephone calls. A further advance is achieved by arranging the adjunct so that a telephone subscriber may place a long distance telephone call to his/her home telephone and have the telephone call automatically billed to a respective service telephone number associated with the adjunct. Thus, a subscriber to the novel service may place a telephone call from virtually any telephone location served by the telecommunications system without the need of placing the call through a telephone operator or a coin telephone. In addition, a party who places a call to a service subscriber via the adjunct and who enters a so-called caller identification number when requested to do so will cause the billing for the call to be charged to the service subscriber rather than to the calling party, in accord with an aspect of the invention.

In particular, when the adjunct receives a call identified by a respective service telephone number, then the adjunct advances the call to the associated service subscriber's home telephone station set if the caller is not the service subscriber. If, on the other hand, the caller is the service subscriber, then the adjunct transmits thereto an announcement defining a menu of personalized calling services that the subscriber may program to customize the manner in which the subscriber receives telephone calls via the adjunct. Such personalized services include, but are not limited to, call forwarding and call screening. In addition, one menu item, in accord with an aspect of the invention, allows the subscriber to place via the adjunct a telephone call to either the subscriber's "home" telephone station set or another telephone station set. The billing for such a telephone call is charged to the service telephone number rather than to the telephone number identifying the subscriber's "home" telephone.

BRIEF DESCRIPTION OF THE DRAWING

The operation of these and other aspects of the claimed invention will become more apparent and better understood by referring to the following detailed description in conjunction with the drawing in which:

DETAILED DESCRIPTION

Figure 1:
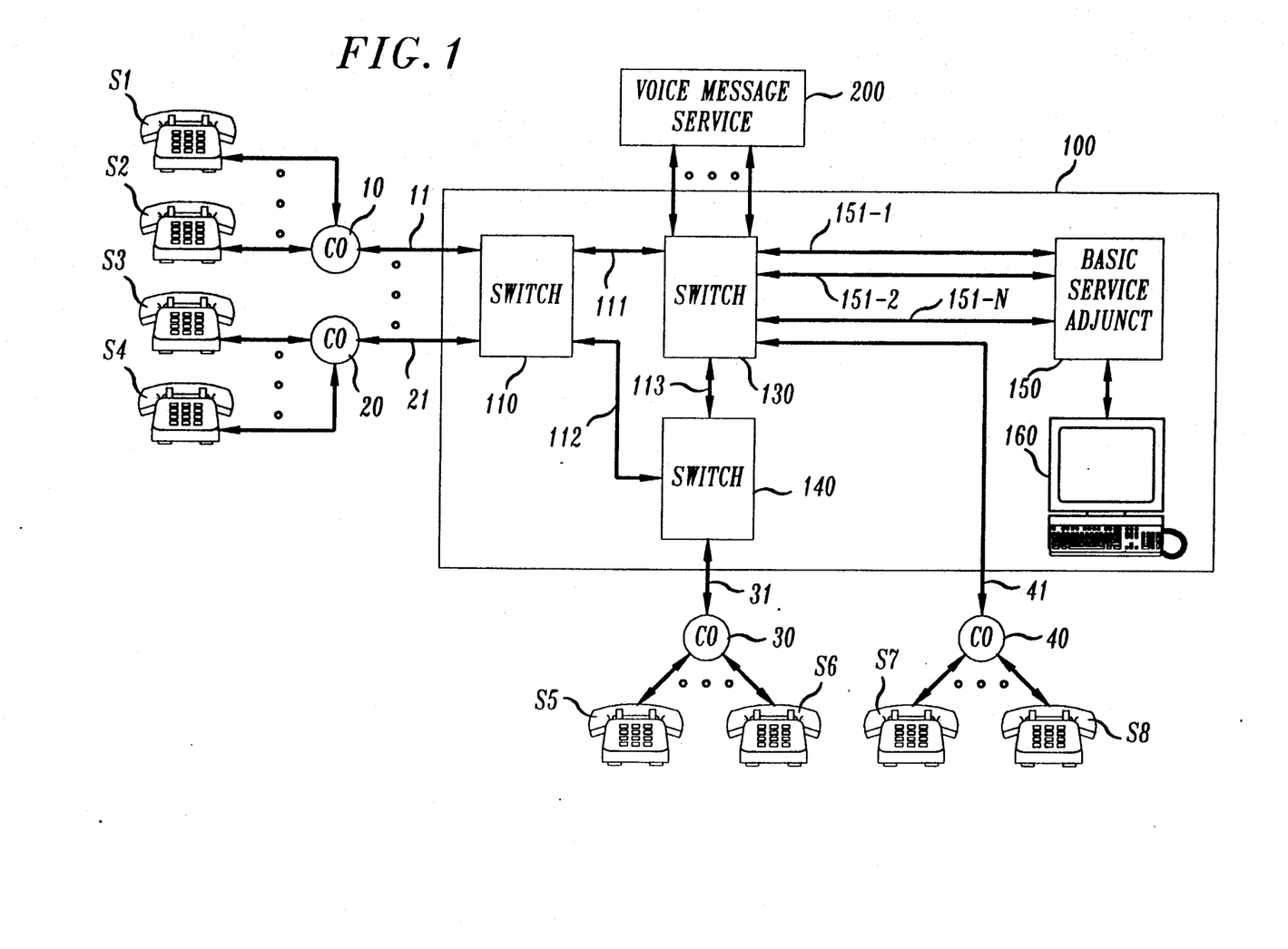
FIG. 1 is a broad block diagram of a communications network in which the principles of the invention may be practiced.

In an exemplary embodiment of the invention, communications network 100, FIG. 1, may be, for example, a public switched telephone network, such as, for example, the well-known AT&T network, that provides long distance telephone services for its subscribers, such as the subscribers associated with telephone stations S1 through S6. Network 100 includes, inter alia, a plurality of Switching (TS) offices, three of which, 110, 130 and 140, are shown in the FIG. Such switches may be any one of the well-known types of switching equipment, and include, for example, the No. 4ESS (Electronic Switching System) and No. 5ESS available from AT&T. It is seen from the FIG. that each switch, e.g., TS 110, is connected to a number of other switches via a so-called inter-toll network, e.g., 111, 112, 113. Each such switch is also connected to a number of Central Offices (CO), e.g., COs 10 and 20. The operation of a central office is well-known and will not be discussed herein. However, it suffices to say that a CO is arranged to send to an associated switch of network 100 a telephone call originated at a calling telephone station set (herein the calling party), e.g., S1, which has dialed a particular long distance telephone number. A CO is also arranged to connect to a telephone station set (herein the called party), e.g., S4, a call that the CO receives from an associated switch.

Included in network 100 is service adjunct 150 which operates, in accord with the invention, to process a call associated with one of its subscribers in a manner prescribed by that subscriber, as will be explained below. Associated with adjunct 150 is voice message service 200 which is external to network 200, but which connects thereto via switch 130. Voice message service 200 may be a conventional voice messaging service that is designed to receive from a calling party via adjunct 150 and network 100 a voice message that is "addressed" to a party who has subscribed to the inventive service as well as message service 200. That is, when a called subscriber does not "answer" a call directed to his/her station set via adjunct 150, then adjunct 150 may direct the calling party to voice message service 200 so that the calling party may store in service 200 a voice message for the called subscriber.

Briefly, upon being connected to service 200 via adjunct 150 and at the direction of a service 200 voice announcement, the calling party may enter a voice message. Service 200, in a conventional manner, stores the voice message in its internal memory at a location that is associated with the called subscriber. Thereafter, the called subscriber may "dial up" service 200 via adjunct 150 and, when requested to do so, enter a so-called Personal Identification Number (PIN), or a password. Service 200, responsive to receipt of the PIN, unloads from its internal memory the voice message and transmits the message to the called party's station set via a network 100 connection established between the subscriber's station set and service 200.

A telephone user, for example, the user associated with station S5, may subscribe to a number of network 100 services including the inventive personalized calling service, which allows a subscriber to customize the way in which he/she receives long distance telephone calls. For example, the subscriber may customize selective calling features, such as call forwarding and call screening, and may also customize particular telephone call billing options, all in accord with the present invention.

A telephone user may subscribe to the inventive service by merely dialing from a telephone station set a predetermined telephone number, e.g., 1-800-555-1000, associated with adjunct 150. Network 100 responsive to receipt of those digits, then establishes a connection (not shown) to terminal 160 attended by a service representative. As a result of interacting with the representative, the new subscriber would be assigned a unique telephone service number that is one of a predetermined range of telephone numbers (e.g., the range from xxx-xxxx to yyy-yyyy). In an illustrative embodiment of the invention, each such unique telephone number employed by the inventive personalized calling service is prefixed by a particular long distance telephone code—illustrative 700. Such a unique telephone number, in accordance with an aspect of the invention, is permanently assigned to a subscriber (user) as long as he/she subscribes to the personalized calling service. What this means is that the assigned number will not change even though the user's local exchange telephone number, e.g., 201-555-6008, changes as a result of the user relocating to an area that is served by another CO. In this sense, then, the assigned personalized calling service telephone number "travels" with the user as he/she relocates from one area to another area of the country. Advantageously, then, a subscriber may selectively identify as his/her long distance telephone number the assigned personalized calling service telephone number, rather than the subscriber's current local exchange telephone number and associated area code.

The subscriber is also assigned a Personal Identification Number (PIN), a security code and a group of Caller Identification Numbers (CIN), in which the group comprises—illustratively four—such numbers. As will be discussed below, a CIN is used, in accord with an aspect of the invention, for call billing purposes. That is, a service subscriber (user) is billed for a call that is placed to his/her unique 700 service number when the calling party enters, at the direction of adjunct 150, a CIN assigned to the called subscriber, as will be discussed below. Thus, in accord with an aspect of the invention, a calling party who enters a CIN is not billed for the associated call. Otherwise, the calling party is billed for the call. Advantageously, then, the calling party may be the subscriber. That is, the subscriber may dial his/her service number to establish a connection to adjunct 150, enter the subscriber's assigned PIN (or one of the associated CINs) when requested to do so, and then enter a request to establish a long distance telephone connection to a desired telephone station set. In this way the need to place the call (a) via an operator in order to "reverse" the telephone charges to the subscriber's local exchange telephone number or to bill the call to a credit card number, or (b) via a so-called coin telephone station is obviated. For example, a service subscriber may, for example, place a long distance call to his/her home telephone station set by dialing the subscriber's assigned service number and, then entering the subscriber's assigned PIN (or one of the associated CINs) when requested to do so, as will be discussed below.

More advantageously, a user may give to a relative, such as a son or daughter, an assigned CIN and that relative may then call home, from virtually any telephone location, via the long distance telephone network without the need of employing a telephone credit card, reversing "charges" or using a coin telephone.

As a further result of the new subscriber interacting with the representative, the representative causes a data record defining the new subscriber's subscription to be stored in memory internal to adjunct 150. The new subscriber may thereafter interact with adjunct 150 to customize, in accord with the invention, the calling features defined by the subscriber's associated data record, as will be explained below.

Figure 2:
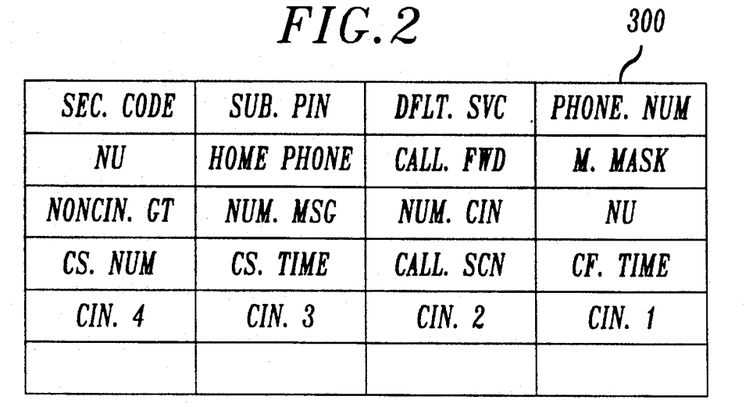
FIG. 2 is an illustrative example of a record associated with a telephone subscriber who has subscribed to the inventive service.

Turning now to FIG. 2, there is shown an illustrative example of a subscriber data record 300 fromed from a plurality of fields. One or more of the fields define a particular aspect of the inventive service as follows:

PHONE.NUM-defines the unique subscription telephone number, e.g., 700-555-2234, assigned to the associated subscriber;

DEFLT.SVC-Defines the services available to a new CIN,

SUB.PIN-defines the PIN number assigned to the associated subscriber;

SEC.CODE-defines the unique security code assigned to the associated subscriber;

M.MASK-defines the services that the associated subscriber has subscribed to;

CALL.FWD-defines a call forwarding telephone number programmed by the subscriber;

HOME.PHONE-defines the "regular" telephone number assigned to the associated subscriber's station set, e.g., the telephone number assigned by the local CO;

NU-Not used;

NU-Not used;

NUM.CIN-defines the number of CINs assigned to the associated subscriber;

NUM.MSG-defines the number of voice messages stored in voice message service system 200 (FIG. 1) for the associated subscriber;

NONCIN.GT-defines a greeting (salutation) that adjunct 150 outputs to a calling party who, when requested to do so, does not enter a CIN associated with the called service subscriber;

CF.TIME-defines the duration of time that the call forwarding feature is in effect;

CALL.SCN-defines whether so-called call screening is in effect;

CS.TIME-defines the duration of time that call screening is in effect;

CS.NUM-defines a particular call screening telephone number that is programmed by the associated subscriber; and CIN.1-4-defines the caller identification number(s) assigned to the associated service subscriber.

Once a telephone user, e.g., the telephone user associated with station S5, has subscribed to the inventive service, then he/she may thereafter interact with adjunct 150 and customize his/her associated record 300 to invoke particular calling features or to change the values of one more of the assigned CINs.

Figure 4:
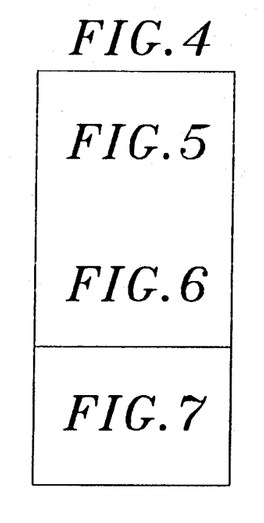
FIG. 4 shows the manner in which FIGS. 5–7 should be arranged.

Referring now to FIGS. 1 AND 4, a subscriber may customize such calling features by dialing his/her service number, e.g., 700-555-2234, to establish a network 100 connection to adjunct 150. In doing so, network 100, i.e., switch 130, in a conventional manner, passes to adjunct 150 the calling and called telephone numbers. Responsive to the connection and receipt of those numbers, adjunct 150 translates the called service number into a memory location and unloads from its internal memory the data record 300 associated with the called service number. Adjunct 150 then returns to the calling party (subscriber in this instance) a recorded message requesting entry of a CIN or subscriber PIN. In the present illustrative example, the station S5 calling subscriber would enter via the associated station set keypad his/her assigned PIN. Adjunct 150 responsive to receipt thereof compares the value of the received PIN with the value of the PIN contained in the associated data record. In this instance adjunct 150 would find that the former and latter values compare with one another and therefore would return to the calling subscriber a prerecorded announcement listing a number of calling features that the subscriber may access and/or customize. An illustrative example of such an announcement may be formatted as follows:

"Welcome to the personalized service system. (1)
To hear your voice messages-press one.
for call forwarding-press two,
to call home or place a call-press three,
for call screening-press four, and
to access your calling identification numbers-press five."

Assuming that the subscriber responsive to announcement 1 enters the digit one by pressing the corresponding keypad button of the station set S5 from which the subscriber is calling, then adjunct 150 responsive to receipt of the tone defining that number unloads the contents of the NUM.MSG field of the associated record. If the contents of that field equals zero, then adjunct 150 returns to the calling subscriber a message indicative of that fact, for example, the following message;

"Sorry you have no messages waiting. Please (2)
press zero to return to the call features menu."

If the value of the contents of the NUM.MSG field is greater than zero, then adjunct 150 returns to the calling subscriber a message indicative of that fact, for example, the following message:

"You have ——— *messages waiting. Please press one if* (3)
wish to access your messages. Otherwise, press zero to
return to the call features menu."

(It is noted that in the above message the dashes represent the verbal equivalent of the value contained in NUM.MSG field.)

Adjunct 150 responsive to receipt of a tone corresponding to the digit zero retransmits to the calling subscriber the above-mentioned call features announcement (1). Alternatively, adjunct 150 responsive to receipt of a tone corresponding to the digit one establishes a connection to switch 130 and outpulses the telephone number assigned to voice message service 200. Switch 130 operating in a conventional manner then extends the connection to service 200. In addition, adjunct 150 bridges the calling subscriber's connection to the connection extending to service 200. At that point, the subscriber may, in a conventional manner, interact with service 200 to hear voice messages that are addressed to the subscriber, as discussed above.

If, on the other hand, the calling subscriber desires to program the call forwarding feature and therefore in response to announcement (1) enters the digit two in the manner discussed above, then adjunct 150 responsive to receipt of the tone defining that number returns via network 100 a prerecorded announcement detailing the various options that the subscriber may elect in connection with the call forwarding feature. An illustrative example of such an announcement may formatted as follows:

"To turn on call forwarding-press one, (4)
to review call forwarding-press two,

-continued

> to turn off call forwarding-press three, and
> to exit the call forwarding feature-press four.

Assuming that the subscriber in response to announcement (4) enters the digit one, then adjunct 150 returns to the calling subscriber an announcement requesting entry of the duration that call forwarding is to be effect in terms of hours. An illustrative example of such an announcement may be formatted as follows:

> "Please enter the number of hours for call (5)
> forwarding followed by the pound sign.
> For continuing call forwarding, please
> press just the pound sign."

If the calling subscriber desires call forwarding for a duration of one hour, then he/she may enter, in a conventional manner, that value (i.e., 1) followed by the pound sign. Adjunct 150 responsive to receipt of the latter entry stores in the CF.TIME field of the subscriber's associated data record the current time and the received duration value. If, on the other hand, the calling subscriber desires continuing call forwarding and enters just the pound (#) sign, then adjunct 150 in response thereto stores in the associated CF.TIME field a predetermined value—illustratively a negative value. As will be seen below, adjunct 150 uses the value stored in the CF.TIME field to confirm that continuing call forwarding is in effect.

Following the foregoing, adjunct 150 returns to the calling subscriber a prerecorded announcement requesting entry of the call forwarding telephone number. An illustrative example of such an announcement may be formatted as follows:

> "To forward calls to the telephone (6)
> number you are calling from, press
> the pound sign; to forward calls to
> a different number, then enter the
> ten digit number, followed by the pound
> sign; to forward calls to your message
> service, then press six, followed by
> the pound sign."

Assuming that the calling subscriber selects the second of the announced options by entering a ten digit telephone number followed by the pound sign, then adjunct 150 stores the digits in a memory register in the order that they are received. (Alternatively, selection of the first or third of such options, would cause adjunct 150 to respectively store in the memory register the calling telephone number that it initially received from switch 130, or a negative value.) Upon receipt of the pound sign adjunct 150 confirms the subscriber's selections by returning an announcement indicative thereof. An illustrative example of such an announcement may be formatted as follows:

> "Your calls will be forwarded to _______ for (7)
> _______ hours. If this is correct, press one,
> to change your entries, press zero."

For the above announcement (7), adjunct 150 substitutes for the first set of dashes the number contained in the aforementioned register or the words "your message service" if the register contains a negative value, and substitutes for the second set of dashes the duration entered by the subscriber. If the subscriber enters a one to verify the correctness of the entries, then adjunct 150 retransmits to the subscriber announcement (1). If, on the other hand, the subscriber presses zero, then adjunct 150 transmits to the subscriber a prerecorded announcement to determine which of the two entries, duration or call forwarding number, that the subscriber desires to change. An illustrative example of such an announcement may be formatted as follows:

> "To change the call forwarding duration-press one, (8)
> to change the call forwarding telephone number-press two."

If, in response to the above announcement, the subscriber presses the digit one (two), then adjunct 150 retransmits announcement 5 (6). When the subscriber has entered the desired change, then adjunct 150 retransmits announcement 7 to once again confirm the correctness of the subscriber's entries.

If, in response to announcement 4, the subscriber presses the digit 2 to review his/her associated record vis-a-vis call forwarding, then adjunct 150, in response thereto and in response to finding that the associated record indicates that call forwarding is in effect, transmits to the calling subscriber the contents of the associated CALL.FWD and CF.TIME fields. The latter transmission may be in the form of a prerecorded announcement modified by the contents of the latter fields. An illustrative example of such an announcement may be formatted as follows:

> "Your calls are being forwarded to _______ for (9)
> _______ hours. If this is correct press one.
> To change your entries, press 0. To cancel
> call forwarding, press 2."

It can be appreciated that, except for the cancellation option, announcement 9 is similar to announcement 7. Thus, the foregoing discussion pertaining to announcement 7 equally pertains to announcement 9. However, if the calling subscriber desires to cancel call forwarding, then in response to announcement 9, he/she may press the digit two. Adjunct 150 responsive thereto, initializes (i.e., sets to zero) the contents of the CALL.FWD, and CF.TIME fields of the associated data record, thereby canceling the invocation of the call forwarding feature. Alternatively, if call forwarding is not in effect, then adjunct 150 notifies the calling subscriber of that fact. Following the foregoing, adjunct 150 retransmits to the calling subscriber menu announcement 4.

If, in response to the latter announcement, the calling subscriber presses the digit 3, then adjunct 150 extends to the user, in the manner discussed above, the option to cancel call forwarding. If, on the other hand, the calling subscriber presses the digit 4, then adjunct 150, in response thereto, exits the call forwarding features menu and retransmits announcement 1.

As discussed above, the calling subscriber may place, via adjunct 150, a long distance call to his/her home, or some other location. The calling subscriber may do so by entering, in a conventional manner and in response to the call features announcement 1, the digit three. Adjunct 150 in response to that selection transmits to the calling subscriber a prerecorded announcement to determine whether the calling subscriber desires to place a call to his/her home or to some other location. An illustrative example of such an announcement may be formatted as follows:

> "To call home press the digit one. (10)
> To call another location, then press
> the digit two."

Assuming that the calling subscriber selects the second option by pressing the digit two, then Adjunct 150 responsive thereto transmits to the calling subscriber an announcement requesting entry of the ten digit telephone number that the calling subscriber desires to call. An illustrative example of such an announcement may be formatted as follows:

> "Please enter the ten digit telephone (11)
> number that you wish to call followed
> by the pound sign. Otherwise, enter
> zero followed by the pound sign to
> return to the call features announcement."

Assuming that the calling subscriber, responsive to the above announcement, enters a ten digit number, for example, the telephone number of 201-555-9876, then adjunct 150 stores in a memory register the dialed digits in the order that they are received. Upon receipt of the last such digit, then, adjunct 150 establishes a connection to switch 130 and outpulses the telephone number contained in the memory register. In addition, and as will be discussed below, adjunct 150 creates a billing record to track the time and charges for the associated call. Adjunct 150 then "bridges" the subscriber's inbound connection to the outbound connection between adjunct 150 and switch 130. In a conventional manner, switch 130 causes the aforementioned connection to be extended to the local CO serving the called telephone station set identified by the outpulsed telephone number. If the local CO finds that the called station is in a busy state (i.e., Off-Hook), then, the CO returns over the established connection so-called busy tone. Assuming that is not the case, then the local CO applies to the telephone line connected to the called station ringing voltage. When the call is "answered", then the calling subscriber and answering party may begin to converse with one another over the bridged connections. When the parties end their conversation, then either party may terminate the established connection in a conventional manner, i.e., by placing their respective station sets in a so-called "on-hook" state. Alternatively, the calling subscriber may terminate the call by entering in the conventional way the pound sign (#) followed by the star sign (*). Adjunct 150, responsive to receipt of those signals, (a) terminates, in the conventional manner, the outbound connection to the called station, and (b) transmits to the calling subscriber announcement 1.

Under certain circumstances, a subscriber, e.g., the station S5 subscriber, may find it desirable to cause adjunct 150 to "screen" calls and to forward to the subscriber's home phone only those calls originated by a particular calling party who enters, in a conventional manner and when requested to do so by adjunct 150, a particular CIN assigned to the subscriber. The subscriber may invoke the latter feature by entering, responsive to hearing announcement 1, the digit four. Adjunct 150, responsive to receipt of that digit, transmits to the calling subscriber a prerecorded announcement requesting entry of the pertinent CIN. An illustrative example of such an announcement may be formatted as follows:

> "For call screening, please enter the call (12)
> identification number followed by the pound sign.
> To cancel call screening, please press the star sign.
> To return to the call features announcement, please
> press zero followed by the pound sign."

If the calling subscriber desires call screening and enters the pertinent CIN, then adjunct 150 upon receipt of the CIN stores it in the aforementioned memory register. Adjunct 150 then transmits to the calling subscriber a prerecorded announcement requesting entry of the desired duration, in terms of hours, that call screening is to be in effect. An illustrative example of such an announcement may be formatted as follows:

> "Please enter the number of hours for call (13)
> screening followed by the pound sign."

If the calling subscriber desires call screening for a duration of, for example, one hour, then he/she may enter that value (i.e., a one) followed by the pound sign. Adjunct 150 responsive to receipt of the latter value respectively stores in the CS.NUM and CS.TIME fields of the subscriber's associated data record the CIN that had been stored in the aforementioned memory register and the current time including the received duration value. In addition, adjunct 150 stores in the associated CALL.SCN field a predetermined value—illustratively a negative number—to confirm that call screening is in effect. Adjunct 150 then confirms the correctness of the entered CIN and duration. Adjunct 150 does this similar to the way that it confirms the correctness of a call forwarding number and associated duration, as discussed above.

Alternatively, if the calling subscriber, in response to announcement 12, enters the star sign, then adjunct 150 initializes the CS.NUM, CS.TIME and CALL.SCN fields of the associated data record to effectively cancel call screening.

It can be appreciated that a subscriber, for whatever reason, may desire changing the value of one or more assigned CINs. A calling subscriber may readily do so by entering, in response to announcement 1, the digit five. Adjunct 150 responsive thereto then (a) unloads from the associated data record the contents of the NUM.CIN field and CIN fields, and (b) forms such contents into an announcement for transmission to the calling subscriber. An illustrative example of such an announcement may be formatted as follows:

> "Your subscription of caller identification numbers (14)
> is ________. The first caller identification number is
> ________, press the pound sign if you wish to change that
> number, otherwise press the star sign . . .
> The second caller identification number is ________,
> press the pound sign if you wish to change that number,
> otherwise press the star sign . . . (and so on)."

The first set of dashes in announcement 14 represent the contents of the associated NUM.CIN field and the subsequent sets of dashes represent the contents of respective ones of the associated CIN fields. Accordingly, if the calling subscriber desires to change one of the assigned CINs, then all that the calling subscriber needs to do, after hearing that portion of the announcement 14 corresponding to that CIN, is to enter the pound sign as requested. Adjunct 150, in turn, transmits to the calling subscriber a request to enter the new CIN followed by the pound sign. Upon receipt of the new CIN, adjunct 150 stores it in the CIN field of the last announced CIN. Adjunct 150 then continues the transmission of the above announcement, thereby allowing the calling subscriber to change the values contained in subsequent ones of the associated CIN fields.

It is noted that in contemplation of the invention, a subscriber may subscribe to more than one group of CINs, in which the additional group(s) of CINs are associated with the subscriber's data record and in which each such group contains—illustratively four—CINs.

Also in contemplation of the invention, a subscriber may subscribe to just a basic service, which provides a service telephone number, but not the calling features discussed above. However, the subscriber may extend his/her subscription to include one or more of those features. As mentioned above, the subscribed features are defined in the M.MASK field of the subscriber's associated data record.

Figure 3:
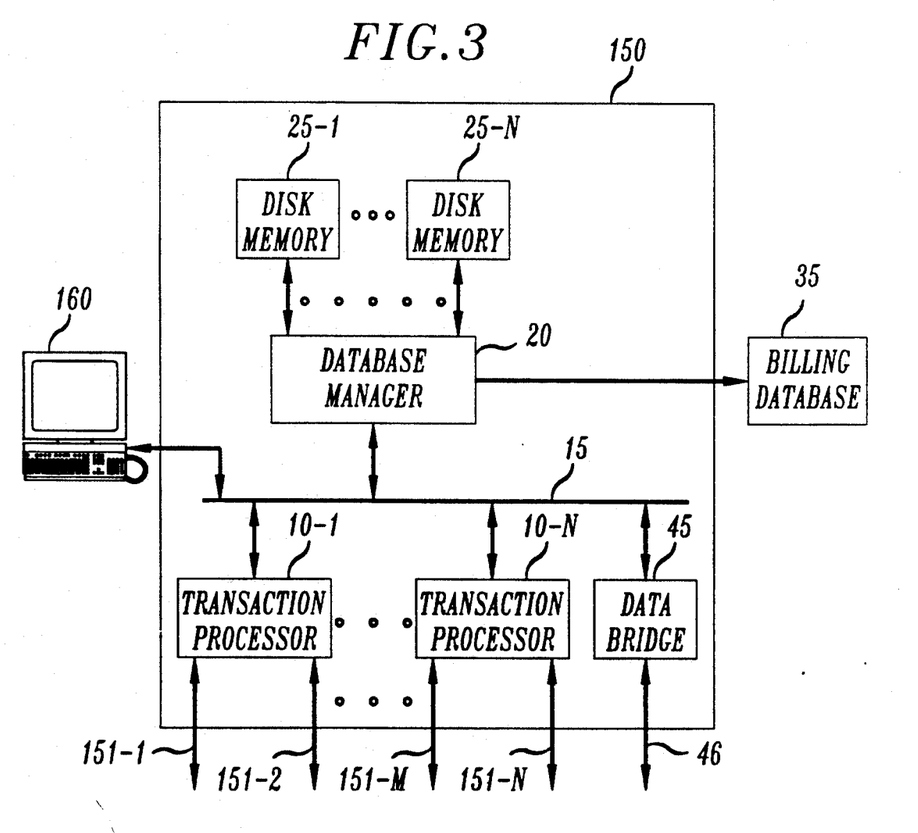
FIG. 3 is an illustrative embodiment of the basic service adjunct shown in FIG. 1

Turning now to FIG. 3, it is seen that adjunct 150 includes a number of transaction processors 10-1 through 10-N each operating in conjunction with database manager 20 to implement the inventive service. In an exemplary embodiment of the invention, each of the transaction processors 10 may be, for example, the well-known Conversant voice information system that is available from AT&T.

Each processor 10 includes a so-called 6386 work group station (not shown) which controls the overall operation of its associated processor 10 and provides standard system services, such as real time clock, memory control, and interrupt handling. The work group station also provides interactions with the keyboard and display of terminal 160, and communicates with associated peripherals via a so-called AT bus. These peripherals (not shown) include RAM, a hard disk, LAN interface as well as various other peripherals. The other peripherals include digital network interface circuits and signal processing circuits for interfacing the associated transaction processor 10 with network 100 via respective ones of the communications paths 151-1 through 151-N.

Each network interface provides a so-called primary rate ISDN digital interface between adjunct 150 and a network switch, such as switch 130 (FIG. 1). As is well-known, a primary ISDN rate interface includes 23 communications channels and one signaling channel, in which each of the 23 channels is operative for establishing a connection, incoming or outgoing, between a switch and adjunct 150. Thus, each of the communications paths 150-1 through 150-N represents a respective primary rate 24 channel circuit between adjunct 150 and network 100.

Communications between one adjunct 150 and another adjunct 150 may be established via data bridge 45 connected to bus 15 and a so-called wide area network represented by path 46. Such Communications may include changes in a subscriber record that occur as a result of the respective subscriber customizing his/her associated service record. Such communications also include a new subscriber record. Thus, each adjuncts 150 that may be disposed in network 100 maintains an up-to-date copy of each subscriber record.

The progression of a call established under the direction of a transaction processor 10 as well as a call received thereat via a channel associated with a respective one of the communications paths 151 is monitored by an associated signal processing circuit operating under the control of an application software program. Such application software implements the inventive service within a transaction processor 10 in the manner discussed above, and operates under the control of the well-known UNIX operating system.

Such application software may be readily implemented (customized) using the so-called Script Builder software provided by the aforementioned Coversant voice interactive system. The latter software allows a user to define the sequences of the application software in terms of menus and in a form specifying the interactions between adjunct 150 and incoming calls as well as outgoing calls. Such interactions include, for example, (a) answering an incoming call, (b) establishing an outgoing call, (c) prompting and collecting caller input, and (d) reading associated data and making logical conclusions, in the manner discussed above. A particular strength of such Script software is that it allows such interactions to be individually invoked for each of the aforementioned transmission channels.

Database manager 20 and associated high density memory disks 25 may be of the well-known type, such as the database manager and disks forming the Star-Server FT system that is also available from AT&T. In particular, manager 20 is a fault tolerant computer and includes three Central Processing Units (CPU) each operating under the control of the aforementioned Unix operating system. Such CPUs operate independent of one another in executing the same stream of instructions contained in their respective cache and onboard memories. The CPUs output to an associated voting circuit their respective results obtained from executing such instructions. If the output of one CPU is different from that outputted by the other two, then the voting unit ignores the output received from the one CPU and accepts the output received from the other two CPUs. In most instances, the accepted output is a response to a database query received from one of the transaction processors 10 via bus 15.

Typically, a database query involves a subscriber record. The aforementioned application software may issue a number of such queries over the course of processing an incoming (inbound) call or establishing an outgoing (outbound) call. In an illustrative embodiment of the invention, subscriber records are stored in one of the disks 25, e.g., disk 25-1, whereas the associated CINs are stored in another one of the disks 25, e.g., disk 25-N.

With the foregoing in mind we now turn to a discussion of the way in which the inventive system processes particular types of telephone calls in accord with a respective subscriber data record. In doing so, it is assumed that the station S5 user is a subscriber of the inventive system and has subscribed to all of the above-mentioned calling features. It is also assumed that the station S5 subscriber is assigned (a) a PIN equal to, for example, 98765, (b) a subscription telephone number of, for example, 700-555-2234, and (c) a group of CINs respectively equal to, for example, 4201 through 4204. It is further assumed that the S5 subscriber (hereinafter Subscriber") has given CIN 4204 to the user associated with station set S1.

Specifically, and referring to FIGS. 1 and 4, if the user at station S1 places a telephone call by first causing station S1 to go off-hook and then dialing the Subscriber's assigned telephone number of 700-555-2234, then, in that event, CO 10 upon receipt of the dialed digits establishes, via a conventional trunking arrangement, a connection between the station S1 telephone line and switch 110. CO 10 then passes to switch 110 the dialed digits (called number) and telephone number of the calling party, namely the station S1 telephone number including its associated area code (calling number). Switch 110, in turn, translates the dialed digits into a so-called destination switch number. In the present illustrative example, it is assumed that the destination switch number identifies switch 130. Accordingly, switch 110 extends the connection to switch 130 via the aforementioned intertoll network represented by path 111 and passes to switch 130 the called and calling telephone numbers. Switch 130, in turn, translates the received called telephone number into a respective trunk group extending to a destination point. Typically, the destination point would be a local CO. However, in accord with an aspect of the invention, the destination point for the subscribed service is service adjunct 150.

Figure 5:
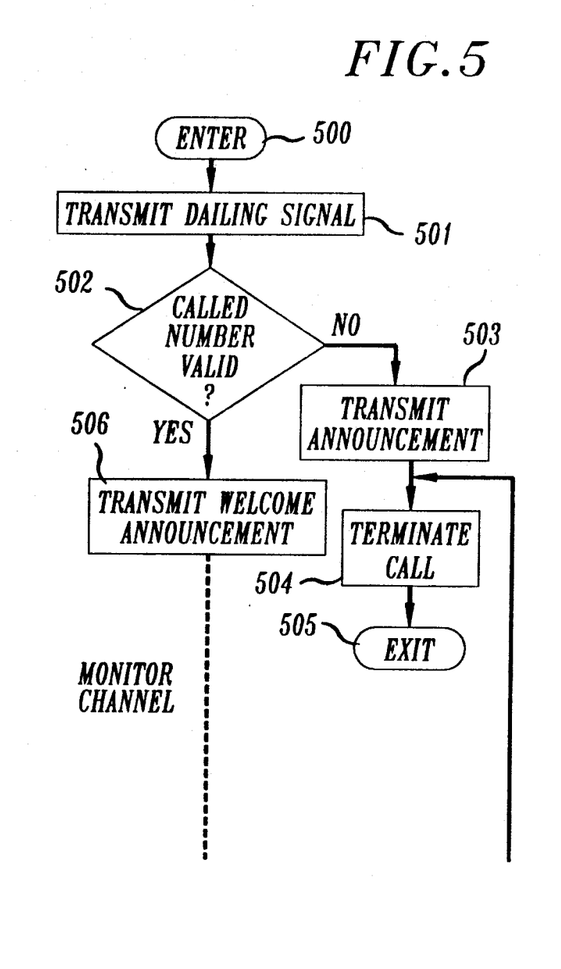
FIGS. 5–7 show a flow chart of the software program which implements the invention in the adjunct of FIG. 3.

Accordingly, switch 130 extends the connection to service adjunct 150 via one of the aforementioned primary rate channels. In doing so, switch 130 sends to adjunct 150 via the primary rate signaling channel associated with one of the paths 151, e.g., 151-1, a so-called call set-up message containing, inter alia, the called and calling numbers. Upon receipt of the message, the adjunct 150 application program returns over the associated channel a ringing signal (block 501) to alert the calling party that the desired connection has been established. After a short duration of time, e.g., three seconds, the application program (hereinafter "program") removes the ringing signal from the channel.

The program (block 502) then forms into a message the received called number (e.g., 700-5552234) and a request to validate the number and sends the message to manager 20 via bus 15. Manager 20, in a conventional manner, determines the validity of the called service number by accessing the database of subscriber records to determine if a subscriber record has been assigned to the called number. If a subscriber record has been so assigned, then manager 20 transmits to the program via bus 15 a message indicating that the called number is valid. Otherwise, the latter message indicates that the called number is not valid. If the manager 20 message indicates that the called number is not valid, then the program (block 503) transmits over the path 151-1 channel an announcement indicating that the called number is not in service. The program (block 504) then terminates the call by transmitting a call termination message over the path 151-1 signaling channel. The program (block 505) then exits.

If the called number is valid, then the program (block 506) transmits over the associated channel a prerecorded "welcome" announcement requesting entry of a personal identification number. The following is an example of such announcement:

"Welcome to the personalized calling system. (15)
If you are calling from a touch-tone telephone
and have a personal calling identification
number, please enter it now followed by the -continued pound sign. Otherwise, just press the pound sign."

The program then monitors, for a predetermined period of time, e.g., 20 seconds, the path 151-1 channel for receipt of a PIN or pound sign only. If, at the end of 20 seconds, the program (block 507) finds that it did not receive a PIN or pound sign only, then the program (block 509) transmits over the associated channel an announcement requesting that the calling party re-enter the personal identification number. Similarly, the program then waits for receipt of the requested information. If, at the end of wait period (i.e., 20 seconds), the program (block 510) finds that it did not receive a PIN or pound sign only, then the program (block 511) checks to see if it received from its associated network 100 switch the calling party's telephone number. If that is the case, then the program (block 513) transmits to the calling party via the path 151-1 channel an announcement indicating that the calling party will be billed for the call.

Figure 6:
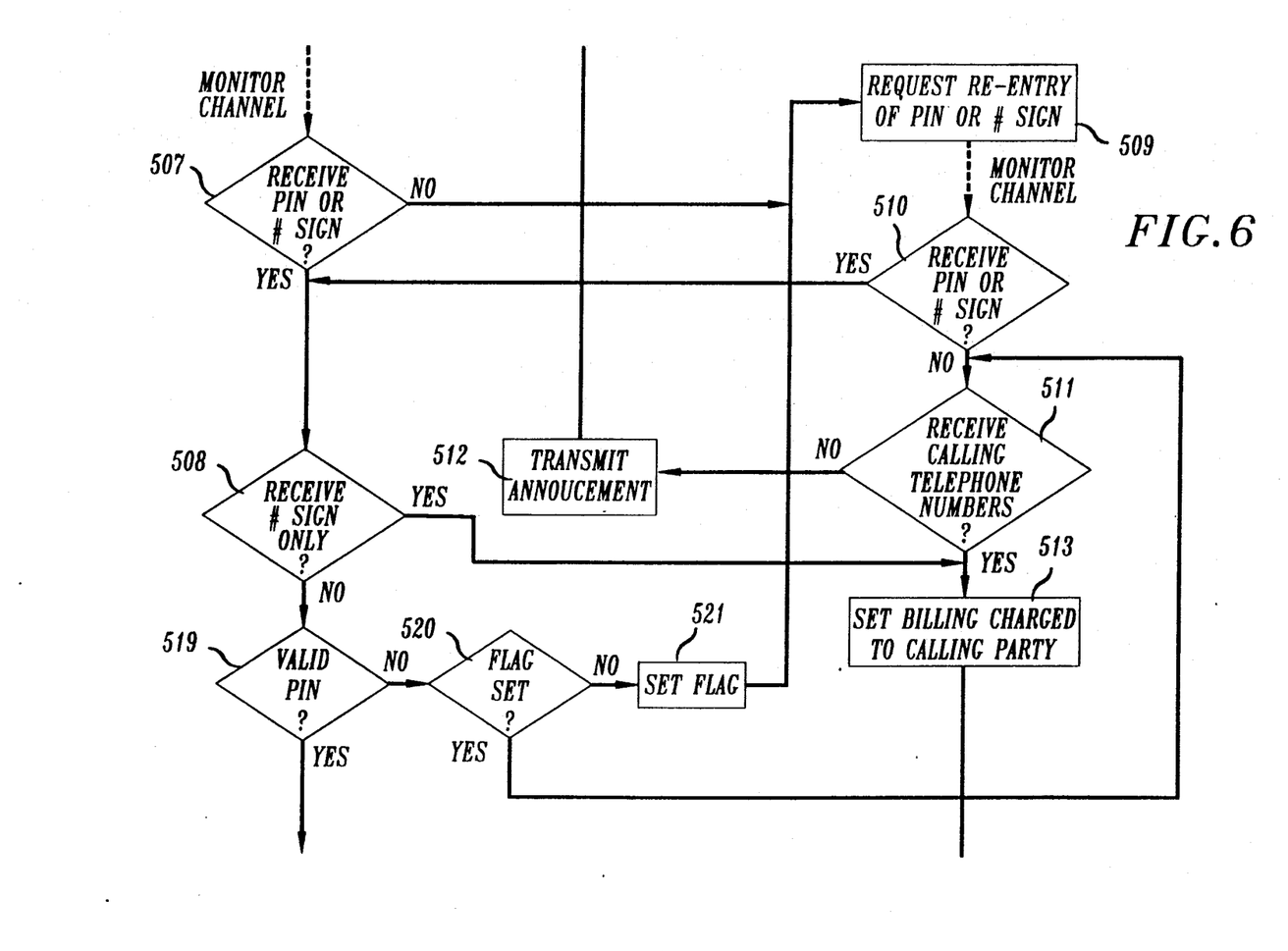

The program (blocks 514, 515, 516) then determines if call forwarding is in effect by sending to manager 20 a message requesting a call forwarding telephone number. If call forwarding is in effect, then manager 20 returns to the program a message containing the call forwarding telephone number. If call forwarding is not in effect, then the message contains the telephone number associated with the called Subscriber's home telephone. The program (block 517) then (a) seizes, in a conventional manner, an idle one of the communications channels associated with one of paths 151-1 through 151-N, for example, path 151-2, (b) bridges the inbound channel associated with the calling station to the seized channel, and (c) sends to switch 130 via the aforementioned signaling channel a so-called "call setup" message containing, inter alia, (i) a request to establish a connection, and (ii) the telephone number contained in the manager 20 message.

Network 100, in a conventional manner, establishes via switches 130 and 140 a connection between the seized path 151-2 channel (and thus adjunct 150) and CO 30 serving the called station, e.g. station S5. CO 30 responsive to receipt of the called telephone number from switch 140, then extends the connection to the telephone line serving station S5. CO 30 then applies to the telephone line the aforementioned ringing voltage to alert the Subscriber to the incoming call.

(It is noted that if the manager 20 message contained instead a call forwarding telephone number, then a telephone connection would be established to the CO serving the telephone station identified by the call forwarding number.) When the Subscriber answers the call, then the program (block 518) generates a conventional telephone billing record. That is, the program inserts in a START field of the associated billing record the current time of day and stores the billing record in local memory. Thereafter, the program monitors the status of the bridged connection to determine the point in time at which the calling or called party terminates the call. At that point, the program inserts in an END field of the associated billing record the current date and time of day. The program then sends the billing record to manager 20 via bus 15 for storage in billing database 35.

If the called subscriber does not answer the call within a predetermined period of time—illustratively 30 seconds—then the program would terminate the connection to the called station. The program would then transmit to the calling party via switch 130 an announcement indicating that the call has not been answered and that a connection to voice messaging service 200 is being established so that the calling party may leave a voice message for the called party. The announcement also indicates that the calling party may forego that option by terminating the call ("hanging up"), as discussed above.

If, on the other hand, the program (block 507) finds that the calling party responded to announcement 15, then the program (block 508) checks to see if that party entered just the pound (#) sign. If that is the case, then the program (block 513) transmits to the calling party an announcement indicating that the calling party would be charged for the call. The program (blocks 514–518) then proceeds to establish a connection to the called Subscriber's telephone station set, in the manner discussed above. If the calling party enters a CIN (e.g., 4204) or subscriber PIN (e.g., 98765), then the program (block 519) checks the validity of the entry. The program does this by sending to manager 20 via bus 15 a message containing, inter alia, the received entry, called telephone number and validation request. Manager 20 responsive to receipt of the message, determines if the entry contained in the message comprises either four digits or five digits. If the entry comprises five digits, indicating that the entry is a subscriber PIN, then manager 20, in a conventional manner, compares the five digit number with the number contained in the SUB.-PIN field of the Subscribers associated service record stored in disk memory, e.g., disk 25-1. If the numbers compare, then manager 20 returns to the program a message indicating that the entry is valid. Otherwise, the message indicates that the entry is invalid.

Similarly, if the entry comprises four digits, indicating that the entry is a caller CIN, then manager 20 compares the four digit entry with the contents of each CIN field associated with the Subscriber's record, and returns to the program the appropriate validation message. If the manager 20 message indicates that the entry is not valid, then the program (block 520) checks to see if it has set a particular flag for the current call. If the flag is set, then the program (block 511) processes the call in the manner discussed above. If the flag is not set, then the program (block 521) sets the flag. The program (block 509) then proceeds in the manner discussed above.

Figure 7:
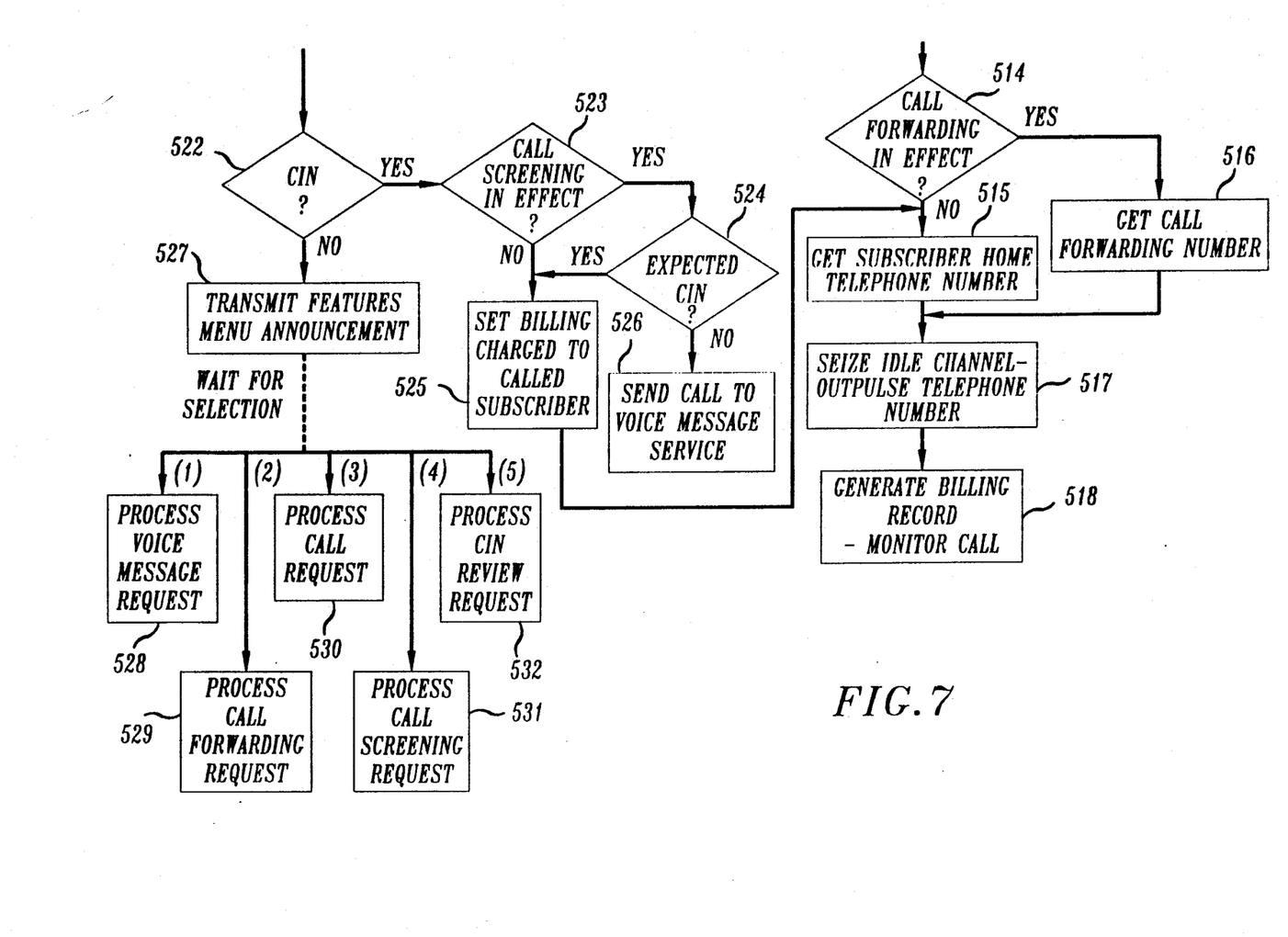

If the manager 20 message indicates that the entry is valid, then the program (block 522) checks the entry to determine if it contains four digits. If that is the case, then the program (523) determines if call screening is in effect. If call screening is in effect, then the program (block 524) determines (via manager 20) if the CIN entered by the calling party compares with the CIN contained in the CS.NUM field of the associated subscriber record. If the CINs compare with one another, then the program (block 525) transmits to the calling party a message indicating that the call will be charged to the called party. The program (blocks 514, 518) then proceeds to establish a connection to the called station in the manner discussed above.

If the CINs do not compare, then the program (block 526) transmits to the calling party an announcement indicating that the caller may leave a voice message for the called Subscriber, as discussed above.

If the number entered by the caller contains five digits, then the program concludes that the calling party is the Subscriber and transmits (block 527) to the Subscriber via the path 151-1 channel call features announcement 1. The program then waits for the Subscriber's selection (entry). Upon receipt of the entry, the program proceeds to an appropriate sub-program (block 528, 529, 530, 531 or 532) to process the Subscriber's selection, in the manner discussed above.

Figure 8:
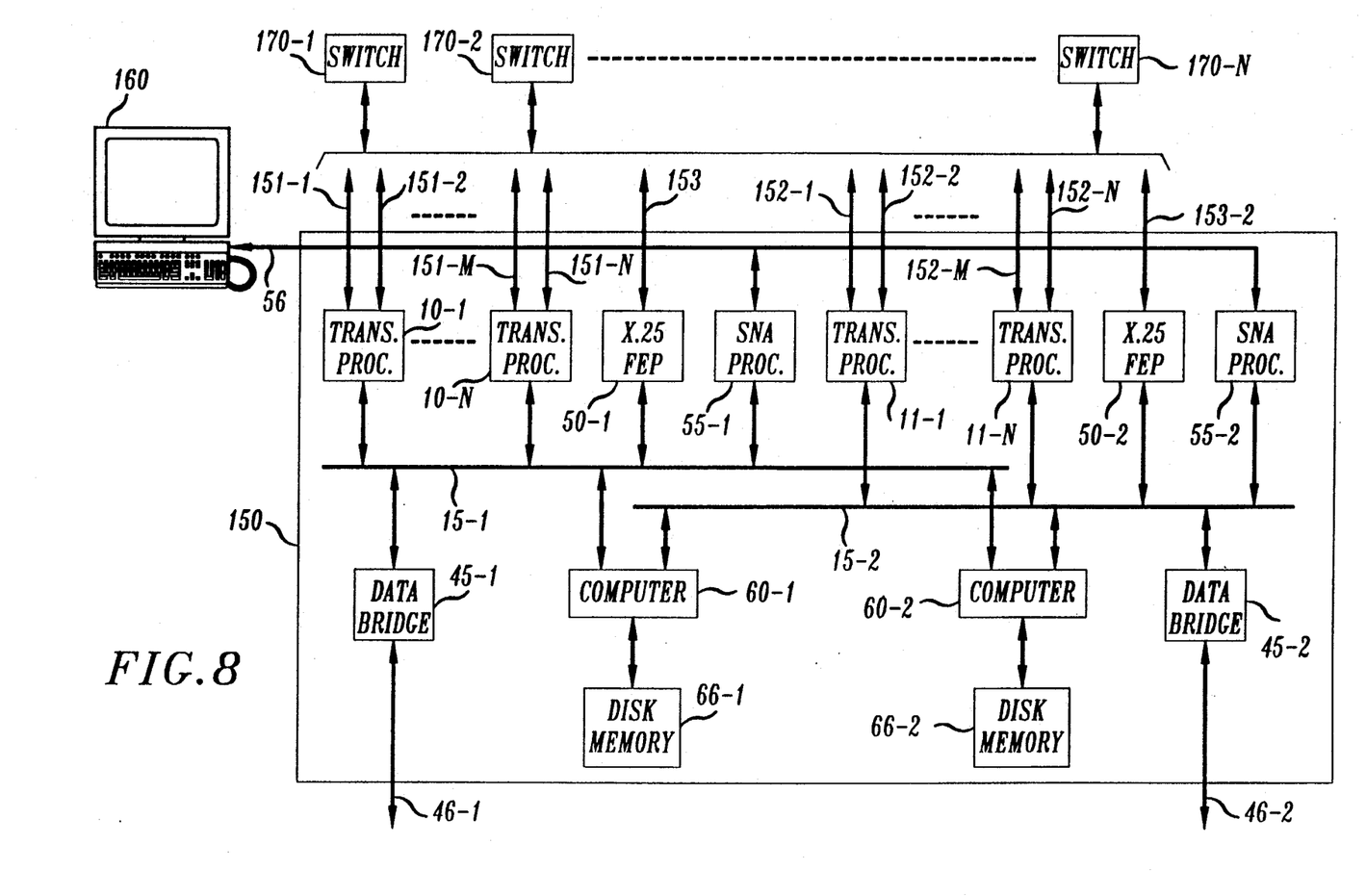
FIG. 8 is an illustrative alternative embodiment of the basic service adjunct shown in FIG. 1.

One possible alternative embodiment of adjunct 150 is shown in FIG. 8. It can be appreciated that FIG. 8 is somewhat similar to FIG. 3. Accordingly, components similar to those shown in FIG. 3 are similarly numbered in FIG. 8.

It is seen from FIG. 8 that adjunct 150 connects to a plurality of network 100 switches 170. In the illustrative alternative embodiment of adjunct 150, each such switch may be the well-known No. 5ESS Operator Service Position System (OSPS) switch available from AT&T. As is well-known the No. 5ESS/OSPS provides operator services. As such, a call placed to a subscriber telephone number would now be preceded by a long distance operator code, i.e., a so-called 0+code.

To enhance its reliability, adjunct 150 is formed from two sections, in which a component in one such section is duplicated in the other such section. Accordingly, a discussion of one such section equally pertains to the other such section.

In particular, each such section includes, a group of transaction processors 10 (11), in which associated communications paths, e.g., paths 151-1 and 151-2, connect a transaction processor, e.g., processor 10-1, to two of the switches 170. In an illustrative embodiment of the invention, each such communications path may be, for example, a so-called T1 carrier line. As is well-known, a T1 carrier line provides 24 channels for carrying a like number of calls. Each such section also includes an X.25 Front End Processor (FEP) 50, SNA processor 55, LAN 15, and a computer 60 associated with a disk memory 66. The X.25 FEP 50 implements the well-known X.25 data transmission protocol and is the means by which an associated section of the adjunct 150 exchanges call signaling information with a network switch 170. That is, X.25 FEP 50 is arranged so that it supplies to its associated computer 60 via LAN 15 call signaling information that FEP 50 receives from a respective one of the switches 170. Similarly, X.25 FEP 50 is arranged to supply to a respective one of the switches 170 call signaling information that FEP 50 receives from an associated computer 60 via LAN 15. In this respect, X.25 FEP 50 connects to each of the switches 170 that connect to associated section transaction processors. The between X.25 FEP 50 and such switches 170 is represented in the FIG. by cable 153.

The processing of incoming and outgoing calls and associated call information as well as data base management of subscriber records stored in a disk memory 66 is handled by the associated computer 60, which may be, for example, the Digital Equipment Corporation VAX-9000. That is, computer 60 operates in accord with the program of FIGS. 5-7 as well as other programs. In this respect, computer 60 is at the heart of adjunct 150, whereas transaction processors 10 (11) and X.25 FEP 50 serve to interface their associated computer 60 with switches 170. In addition, and as a means of further improving the redundancy of adjunct 150, each computer 60 is connected to each LAN 15, as shown in the FIG.

As mentioned above, a new subscriber record is inputted by an attendant operating terminal 160. Terminal 160 connects to each section of adjunct 150 via a respective SNA processor 50. Each SNA processor 50 implements the well-known IBM SNA protocol, and is used to interface terminal 160 with a respective computer 60. Thus, a newly inputted subscriber record is passed to both computers 60 via their respective SNA processors 50 and LANs 15. Both of the computers 60, in turn, store the new record, or a change to an existing record, in their respective disk memories 66. A computer 60 may also receive from another adjunct 150 via the associated data bridge 45 a new subscriber record, or a change to an existing record. In this way, each adjunct 150 maintains an updated copy of each subscriber record, as mentioned above.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An arrangement for providing a personalized calling service in a telecommunications network formed form a plurality of switches interconnected via respective communications paths, said arrangement comprising means for associating a plurality of service telephone numbers with respective subscribers of said service, means for associating said subscribers with respective groups of caller identifiers such that each of said subscribers may specify a particular call treatment for each caller identifier forming the respective one of said groups, and means, responsive to receiving from one of said switches a telephone call associated with one of said plurality of service numbers and responsive to receipt of an associated caller identifier, for processing said telephone call in accordance with the call treatment specified for the received caller identifier.

2. The arrangement set forth in claim 1 wherein each of said subscribers is associated with a unique personal identification number, and wherein said arrangement further comprises a memory having a plurality of memory locations for the storage of data records associated with respective ones of said plurality of service telephone numbers, each of said records comprising a plurality of fields, at least one of said fields of each of said records containing said associated personal identification number, and wherein said means for processing includes means for prompting a caller to enter a personal identifier and for receiving an entry when it is so entered, and means, responsive to receipt of said entry, for then determining whether the caller is one of said subscribers based on whether said entry compares with the personal identification number stored in an associated record identified by said one of said plurality of service telephone numbers.

3. The arrangement set forth in claim 2 wherein said means for determining includes means, operative in the event that said entry does not compare with the personal identification number associated with said one service telephone number, for then billing said telephone call to said one subscriber based on whether said entry compares with one of the caller identifiers forming the respective one of said groups of caller identifiers.

4. The arrangement set forth in claim 2 wherein said means for determining includes means, operative in the event that said entry compares with the associated personal identification number, for then transmitting a menu of options to the caller, said options including an option to place a telephone call and wherein said means for transmitting includes means, operative following said transmission of said menu and responsive to receipt of an entry selecting said option to place a telephone call, for then transmitting a message requesting said caller to enter a called destination, and means for establishing via said network a telephone connection to either (a) a first telephone station set associated with said caller or (b) a second telephone station set if, in response to said destination request, said caller respectively enters a signal identifying said associated first telephone station or a telephone number identifying said second telephone station set.

5. The arrangement set forth in claim 4 wherein said means for establishing includes means for billing said telephone call to said one subscriber's associated service telephone number.

6. The arrangement set forth in claim 4 wherein said means for establishing includes means, responsive to said telephone call being terminated, for retransmitting said menu to said caller.

7. The arrangement set forth in claim 4 wherein said menu includes a call forwarding option and wherein said means for transmitting further includes means, operative following said transmission of said menu and responsive to receipt of any entry selecting said call forwarding option, for then transmitting over said telephone connection a message requesting said caller to enter a call forwarding telephone number, means, responsive to receiving from said caller via said telephone connection a signal identifying a calling telephone station or receiving a telephone number identifying another telephone station set, for respectively storing in another field of the associated record the telephone number of said calling station set or the telephone number identifying said another telephone station set, and means, thereafter operative and responsive to receipt of another telephone call from a caller other than said one subscriber, for extending said another telephone call to the telephone station set identified by the contents of said another field of the associated record.

8. The arrangement set forth in claim 4 wherein said menu includes a call screening option and wherein said means for transmitting includes.

means, operative following said transmission of said menu and responsive to receipt via said telephone connection of an entry selecting said call screening option, for then transmitting over said telephone connection a message requesting entry of a caller identifier, and means, responsive to receipt of said caller identifier via said telephone connection, for storing the received caller identifier in another field of the associated record, and means, thereafter operative and responsive to receipt of another telephone call from a caller other than the associated one of said subscribers, for extending said another call to a telephone station set associated with said one subscriber only if the originator of said another call enters a caller identifier which compares with the caller identifier stored in said another field of the associated record.

9. The arrangement set forth in claim 4 wherein said menu includes an option to change individual ones of the caller identifiers forming the group associated with said one service telephone number, and wherein said means for transmitting includes means, operative following said transmission of said menu and responsive to receipt via said telephone connection of an entry selecting said option to change said caller identifiers, for transmitting over said telephone connection an announcement identifying each of the caller identifiers forming the respective one of said groups, and means, operative following the announcement of each of said caller identifiers and responsive to receiving via said telephone connection a new caller identifier entered by said caller in response to the last announced caller identifier, for then substituting in the associated record said new caller identifier for said last announced caller identifier.

10. The arrangement set forth in claim 7 further comprising a voice message system disposed in association with said network, and wherein said means for extending includes means, operative following said extension of said another telephone call to said identified telephone station set and responsive to an absence of an indication that said identified telephone station set has gone off-hook, for then transmitting to the caller via said another telephone call an announcement providing an option to establish a connection to said voice message system, and means, responsive to receipt of a signal indicating that said caller has selected said option, for establishing via said network a connection to said voice message system so that said caller may enter thereat a voice message for said one subscriber.

11. The arrangement set forth in claim 10 wherein said menu includes an option to access via said network said voice message system and wherein said means for transmitting includes means, operative following said transmission of said menu and responsive to receipt via said telephone connection of another signal indicating that said one subscriber has selected said option, for connecting said one subscriber to said voice message system so that said one subscriber may interact with said voice message system to obtain voice messages stored thereat and addressed to said one subscriber.

12. A method of providing personalized calling services in a telecommunications network formed from a plurality of interconnected switches, said method comprising the steps of associating a plurality of service telephone numbers with respective subscribers of said service, associating said subscribers with respective groups of caller identifiers such that each of said subscribers may specify a particular call treatment for each caller identifier forming the respective one of said groups, and responding to receipt of a telephone call associated with one of said plurality of service numbers and to receipt of an associated caller identifier, by processing said telephone call in accordance with the call treatment specified for the received caller identifier.

13. The method set forth in claim 12 wherein each of said subscribers is associated with a unique personal identification number, and wherein said method further comprises the step of storing in a memory data records associated with respective ones of said plurality of service telephone numbers, in which each of said records comprises a plurality of fields, storing in one of said fields of each of said records the associated personal identification number, and wherein said step of processing includes the step of prompting a caller to enter a personal identifier and receiving an entry when it is so entered, and responding to receipt of said entry by determining whether said caller is one of said subscribers based on whether said entry compares with the personal identification number stored in an associated record identified by said one of said plurality of service telephone numbers.

14. The method set forth in claim 13 wherein the step of responding to receipt of said entry includes the step of responding, in the event that said entry does not compare with the personal identification number associated with said one service telephone number, by then billing said telephone call to said one subscriber based on whether said entry compares with one of the caller identifiers forming the respective one of said group of called identifiers.

15. The method set forth in claim 13 wherein the step of determining includes the step of responding, in the event that said entry compares with said personal identification number, by transmitting a menu of options to the caller, said options including the option to place a telephone call, and wherein said step of transmitting includes the step of responding to receipt of a request from said caller requesting the option to place a telephone call by transmitting over a telephone connection to said caller a message requesting said caller to enter the destination of said telephone call, and establishing via said network a telephone connection to either (a) a first telephone station set associated with said caller or (b) a second telephone station set if, in response to said destination request, said caller respectively enters a signal identifying said associated first telephone station or enters a telephone number identifying said second telephone station set.

16. The method set forth in claim 15 wherein said step of establishing includes the step of billing said telephone call to said one subscriber's associated service telephone number.

17. The method set forth in claim 15 wherein said step of establishing includes the step of responding to said telephone call being terminated by retransmitting said menu to said caller.

18. The method set forth in claim 15 wherein said menu includes a call forwarding option and wherein said step of transmitting includes the steps of responding, following said transmission of said menu, to receipt via said telephone connection of an entry selecting said call forwarding option by transmitting over said telephone connection a message requesting said caller to enter a call forwarding telephone number, responding to receipt via said telephone connection of a signal identifying a calling telephone station or receipt of a telephone number identifying another telephone station set by respectively storing in another field of the associate record the telephone number of said calling station set or the telephone number identifying said another telephone station set, and therafter responding to receipt of another telephone call from a caller other than said one subscriber, by extending said another telephone call to the telephone station set identified by the contents of said another field of said associated record.

19. The method set forth in claim 15 wherein said menu includes a call screening option and wherein said step of transmitting includes the steps of responding, following said transmission of said menu, to receipt via said telephone connection of an entry selecting said call screening option, by transmitting over said telephone connection a message requesting entry of a caller identifier, and responding to receipt via said telephone connection of a caller identifier of the respective one of said groups of caller identifiers, by storing the received caller identifier in another field of the associated record, and responding thereafter to receipt of another telephone call from a caller other than said one subscriber by extending said another telephone call to a telephone station set associated with said one subscriber only if the originator of said another call enters a caller identifier which compares with the caller identifier stored in said another field of said associated record.

20. The method set forth in claim 15 wherein said menu includes an option to change individual ones of the caller identifiers forming the group associated with said one service telephone number, and wherein said step of transmitting said menu of options includes the steps of responding, following said transmission of said menu to receipt via said telephone connection of an entry selecting said option to change said caller identifiers, by transmitting over said telephone connection an announcement identifying each of the caller identifiers forming the respective one of said groups, and responding, following the announcement of each of said caller identifiers, to receipt via said telephone connection of a new caller identifier entered by said caller in response to the last announced caller identifier by substituting in the associated record said new caller identifier for said last announced caller identifier.

21. The method set forth in claim 18 further comprising the step of providing a voice message system disposed in association with said network, and wherein said step of extending includes the steps of responding, following said extension of said another telephone call to said identified telephone station set, to an absence of an indication that said identified telephone station set has gone off-hook by transmitting to the caller of said another telephone call an announcement providing an option to establish a connection to said voice message system, and responding to receipt of a signal indicating that said caller has selected said option by establishing via said network a connection to said voice message system so that said caller may enter thereat a voice message for said one subscriber.

22. The method set forth in claim 21 wherein said menu includes an option to access via said network said voice message system and wherein said step of transmitting includes the step of responding, following said transmission of said menu, to receipt via said telephone connection of another signal indicating that said one subscriber has selected said option, by connecting said one subscriber to said voice message system so that said one subscriber may interact with said voice message system to obtain voice messages stored thereat and addressed to said one subscriber.

* * * * *

UNITED STATES PATENT AND TRADEMARK OFFICE
CERTIFICATE OF CORRECTION

PATENT NO. : 5,222,125
DATED : June 22, 1993
INVENTOR(S) : Carroll W. Creswell, Francine S. Frome, Daniel S. Furman
Philip S. Kravitz, R.A. Lakshmi-Ratan, S.G. Lanning, B.S.L.*

It is certified that error appears in the above-indentified patent and that said Letters Patent is hereby corrected as shown below:

Column 17, line 26, "form" should read --from--.
Column 18, line 39, "any" should read --an--.
Column 20, line 37, "group" should read --groups--,
"called" should read --caller--.

Signed and Sealed this

Tenth Day of May, 1994

Attest:

BRUCE LEHMAN

*Attesting Officer*   Commissioner of Patents and Trademarks